US010394274B2

(12) United States Patent
Ramaswamy et al.

(10) Patent No.: US 10,394,274 B2
(45) Date of Patent: Aug. 27, 2019

(54) FLEXIBLE ELECTRONIC DISPLAY DEVICES

(71) Applicant: Microsoft Technology Licensing, LLC, Redmond, WA (US)

(72) Inventors: Govind Ramaswamy, Lynnwood, WA (US); Deepak Mani, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 112 days.

(21) Appl. No.: 15/252,867

(22) Filed: Aug. 31, 2016

(65) Prior Publication Data

US 2018/0059718 A1 Mar. 1, 2018

(51) Int. Cl.
*G06F 1/16* (2006.01)
*H05K 5/00* (2006.01)

(52) U.S. Cl.
CPC ......... *G06F 1/1616* (2013.01); *G06F 1/1632* (2013.01); *G06F 1/1643* (2013.01); *G06F 1/1652* (2013.01); *G06F 1/1654* (2013.01); *G06F 1/1677* (2013.01);
(Continued)

(58) Field of Classification Search
CPC .... G06F 1/1652; G06F 1/1681; G06F 1/1616; G06F 1/1637; G06F 1/1643; G06F 1/1677; G06F 1/1632; H04M 1/0216; H04M 1/0268; H04M 1/0245; H04M 1/022; H04M 1/0247; H04M 1/0214; E05D 11/1064; E05D 1/00; E05D 1/04; E05D 7/12; E05D 11/0054; E05D 11/0081; E05D 11/06; E05D 11/01014; E05D 2007/128; E05Y 2800/244; E05Y 2900/606
See application file for complete search history.

(56) References Cited

U.S. PATENT DOCUMENTS 5,949,643 A    9/1999  Batio
6,667,878 B2  12/2003  Ponx
7,821,780 B2  10/2010  Choy
(Continued)

OTHER PUBLICATIONS

Hinckley, et al., "Codex: A Dual Screen Tablet Computer", In Proceedings of the SIGCHI Conference on Human Factors in Computing Systems, Apr. 9, 2009, pp. 1933-1942.

*Primary Examiner* — Dimary S Lopez Cruz
*Assistant Examiner* — Ingrid D Wright
(74) *Attorney, Agent, or Firm* — Ray Quinney & Nebeker P.C.; Paul N. Taylor (57) ABSTRACT

A flexible electronic device is provided herein. The device may include a display unit having a continuous display area extending across a first section, a second section, and a transition section of the device, where the transition section is positioned between the first section and the second section. The device is configured to bend about a first axis positioned in a same plane as a center of the transition section, at a distance greater than zero from a first surface of the device positioned in the plane. The device may be configured to bend about a hinge positioned at least partially within the transition section. The device may include a sensor configured to identify a position of the first section relative to the second section of the device, and a processor configured to determine which image or images to display on the display unit based on the identified position.

15 Claims, 7 Drawing Sheets

(52) U.S. Cl.
CPC .......... *G06F 1/1681* (2013.01); *G06F 1/1637* (2013.01); *G06F 1/1641* (2013.01)

(56) References Cited

U.S. PATENT DOCUMENTS

| | | |
|---|---|---|
| 7,899,397 B2 | 3/2011 | Kumar |
| 8,149,224 B1 | 4/2012 | Kuo et al. |
| 8,462,103 B1 | 6/2013 | Moscovitch et al. |
| 8,724,301 B2 | 5/2014 | Mahmoud |
| 9,253,379 B2* | 2/2016 | Lam .................. G06F 1/1616 |
| 2003/0112585 A1 | 6/2003 | Silvester |
| 2003/0198008 A1 | 10/2003 | Leapman et al. |
| 2004/0108968 A1 | 6/2004 | Finke-Anlauff |
| 2006/0183505 A1 | 8/2006 | Willrich |
| 2008/0062625 A1 | 3/2008 | Batio |
| 2010/0238119 A1* | 9/2010 | Dubrovsky ........... G06F 1/1626 345/169 |
| 2011/0306859 A1* | 12/2011 | Saldivar ............... A61B 5/6823 600/365 |
| 2013/0070431 A1* | 3/2013 | Fukuma ............... G06F 1/1652 361/749 |
| 2013/0076592 A1* | 3/2013 | Reeves ................. G06F 3/1446 345/1.3 |
| 2014/0226275 A1* | 8/2014 | Ko ........................ G06F 1/1652 361/679.27 |
| 2015/0022436 A1* | 1/2015 | Cho ...................... G06F 1/1652 345/156 |
| 2015/0092329 A1 | 4/2015 | Balasundaram et al. |
| 2015/0277506 A1* | 10/2015 | Cheah .................. G06F 1/1681 361/679.27 |
| 2015/0326053 A1* | 11/2015 | Amano .................. H02J 17/00 320/108 |
| 2016/0132074 A1* | 5/2016 | Kim ..................... G06F 1/1652 715/769 |
| 2016/0132075 A1* | 5/2016 | Tazbaz ................. G06F 1/1681 361/679.27 |

* cited by examiner

FLEXIBLE ELECTRONIC DISPLAY DEVICES

BACKGROUND

Mobile computing users may require the ability to multitask, but current mobile computing technology is inherently limited due to its form factor (e.g., a single screen tablet computing device). Since many tasks have a natural division of labor, (e.g., reading occurring in conjunction with writing), users may painstakingly and unproductively toggle between devices or screens to perform routine tasks. For example, while writing, a user may have to search the Internet for information, but this should be able to be done in conjunction with the user's primary task. It is for this, that a multi-screen display within a mobile computing device may offer productivity solutions to solve many of these problems.

Flexible display devices may have problems with visual distortions appearing on the display screen after the display device has been bent one or more times. For example, a display device may have problems when a user folds a display device like closing a book, wherein pixels at or near the folding location are damaged. In other words, the process of bending the display device may temporarily or permanently damage certain pixels within the display, locally altering the image by color and/or intensity. This provides challenges in the manufacturing design of a flexible display device.

SUMMARY

Flexible display devices are described herein. In one or more embodiments, the flexible electronic device includes a display unit having a continuous display area extending across a first section, second section, and transition section of the flexible electronic device, wherein the transition section is positioned between the first section and the second section, and wherein the flexible electronic device is configured to bend about a first axis positioned in a same plane as a center of the transition section, at a distance greater than zero from a first surface of the flexible electronic device positioned in the plane.

In another embodiment, a flexible electronic device includes a transparent cover, a hinge, and a display unit disposed between the transparent cover and the hinge, wherein the display unit comprises a continuous display area extending across a first section, second section, and transition section of the flexible electronic device, wherein the transition section is positioned between the first section and the second section, wherein the hinge is positioned at least partially within the transition section, wherein the flexible electronic device is configured to bend about the hinge and move between a plurality of positions, and wherein a portion of the transparent cover in the transition section does not contact any another portion of the transparent cover in the transition section in any position of the plurality of positions.

In another embodiment, a flexible electronic device includes a display unit having a continuous display area extending across a first section, second section, and transition section of the flexible electronic device, wherein the transition section is positioned between the first section and the second section. The device further includes a sensor configured to identify a position of the first section of the flexible electronic device relative to the second section of the flexible electronic device. The device further includes a processor configured to determine which applications to run or which image or images to display on the display unit based on the identified position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWING FIGURES

For a more complete understanding of the disclosure, reference is made to the following detailed description and accompanying drawing figures, in which like reference numerals may be used to identify like elements in the figures.

While the disclosed devices and systems are representative of embodiments in various forms, specific embodiments are illustrated in the drawings (and are hereafter described), with the understanding that the disclosure is intended to be illustrative, and is not intended to limit the claim scope to the specific embodiments described and illustrated herein.

DETAILED DESCRIPTION

Disclosed herein are flexible electronic devices and systems including a flexible electronic device. Such devices and systems have several potential end-uses or applications, including any electronic device having a display unit capable of being bent or folded about one or more axes. In particular, such flexible electronic devices and systems may be included within a mobile electronic device, including, but not limited to, personal computers (PCs), tablet and other handheld computing devices, laptop or mobile computers, communications devices such as mobile phones, multiprocessor systems, microprocessor-based systems, programmable consumer electronics, minicomputers, or audio or video media players. In certain examples, the computing environment is a flexible wearable electronic device, wherein the device may be worn on or attached to a person's body or clothing.

As described herein, the flexible electronic device includes a display unit having a continuous display area extending within multiple sections of the device. The device is configured to bend, such that the display unit extending within the multiple sections also bends. In other words, the display unit is configured to move between a flat, planar configuration to at least one bent configuration where one section of the device and display unit is positioned in a separate plane from another section of the device and display unit. This is advantageous for a number of reasons.

First, the flexibility of the device allows for a large, flat display device to be reconfigured into a more compact configuration. For example, a tablet computer device having a length or width of 50 centimeters when fully open or flat may be bent about an axis near the center of the device and reconfigured into a closed configuration with a new length or width of approximately 25 centimeters. Such a flexible device, which may have been too large or cumbersome in an open, flat configuration, may now be carried or stored within a backpack, briefcase, or purse in the compact, closed configuration. Additionally, a mobile phone device having a length or width of 20 centimeters when fully open or flat may be bent about an axis near the center of the device and reconfigured into a closed configuration with a new length or width of approximately 10 centimeters. Such a device, which may have been too large or cumbersome in an open, flat configuration to fit into a jacket or pants pocket, may now be carried or stored within the jacket or pants pocket.

Second, the flexibility of the device allows for different working arrangements based upon the location of the user. For example, the electronic device may be positioned in the flat, open configuration for use as an office monitor. In such a configuration, the device may be docked into a docking station for use with external peripherals such as a keyboard or mouse. Additionally, the device may be moved or bent into a laptop configuration such that one section of the device and display unit is used as a touch screen keyboard and/or mouse, while a second section of the device and display unit is used as a monitor in communication with the touchscreen keyboard and/or mouse.

Third, the flexibility of the device from a flat configuration to a bent configuration allows for various multi-tasking options, such as segmenting a single display area into multiple discrete sections based upon whether the device is flat or bent. In other words, each section of the device may run a different application or provide a different image when in a bent configuration, or the same application may be run or the same image may extend across all sections when the device is in a flat configuration. In some instances, different applications may be run in different sections of the device when the device is bent. The images or applications may be programmable as well, such that when the device senses it is in a bent configuration, certain applications are opened or images are displayed. For example, if the device senses it is bent at a certain angle, one section of the device may display a touchscreen keyboard (like a laptop configuration).

Various examples of such a flexible electronic device are discussed in further detail below.

Figure 1:
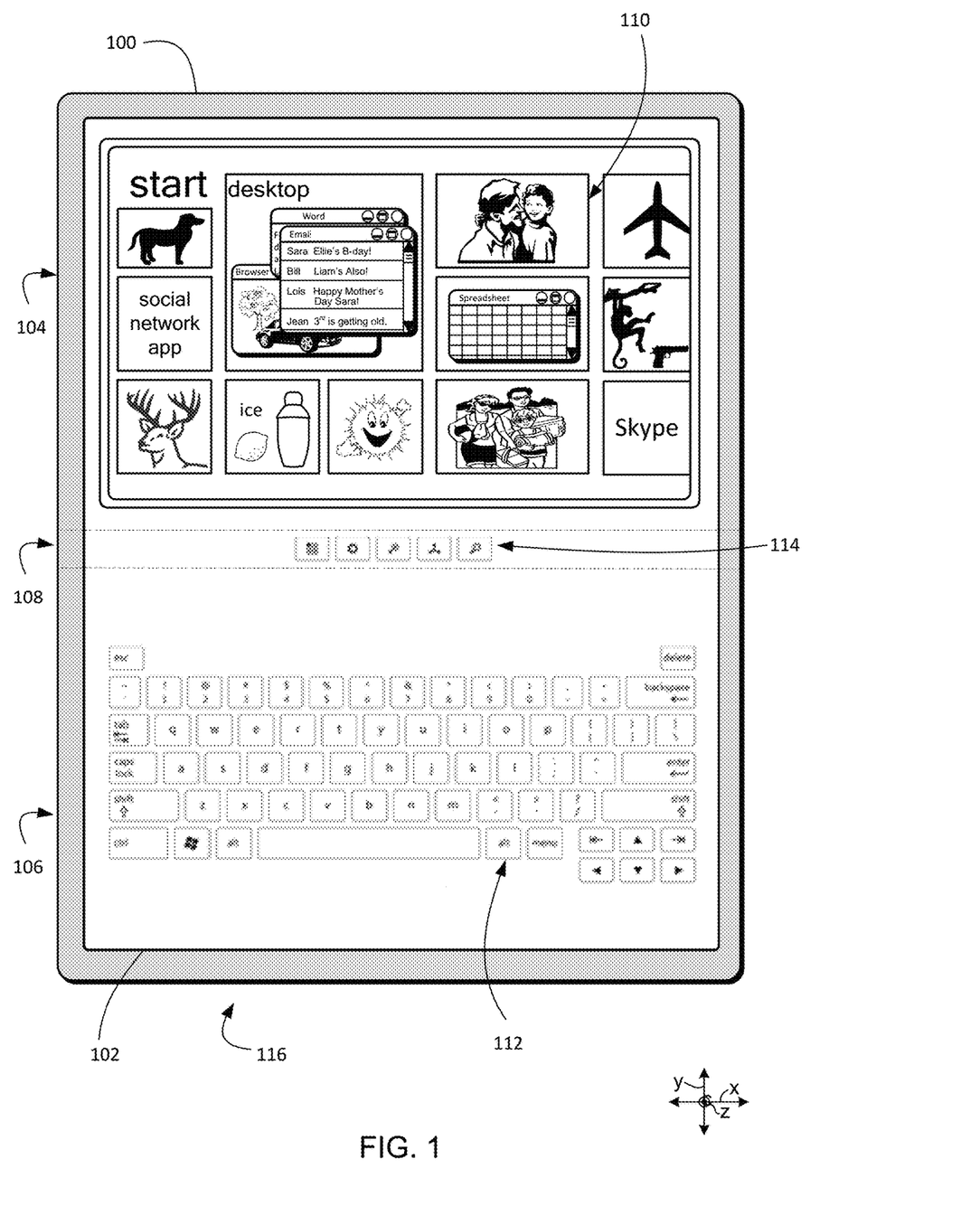
FIG. 1 depicts an example of a flexible electronic device including a display having a first section, a second section, and a transition section connecting the first and second sections.

FIG. 1 depicts an example of a flexible electronic device 100 positioned in a flat configuration. The flexible electronic device 100 includes a display unit having a continuous display area 102 extending across multiple sections of the device. As depicted, the device has a first section 104, a second section 106, and a transition section 108 positioned between and connecting the first section 104 and the second section 106.

The device 100 may be configured to run a same application or display a same image across the multiple sections, or run a different application or display separate images in at least two different sections of the display area of the device. As depicted in FIG. 1, the display area in the first section 104 of the device displays a first image 110 of an example of a start screen for a Windows operating system. The display area in the second section 106 displays a second, separate image 112 of a keyboard. Additionally, the display area in the transition section 108 displays a third, separate image 114 of a task bar or a plurality of shortcut keys.

The flexible electronic device 100 is configured to move or bend between a plurality of positions or configurations. In one position, as depicted in FIG. 1, the device 100 is in a flat configuration 116 such that the multiple sections 104, 106, 108 of the device 100 lie within a same plane (i.e., the sections of the device are coplanar). In the example of FIG. 1, the first section 104, second section 106, and transition section 108 are all positioned within the x-y plane. The device may also be configured to be moved into one or more bent configurations, wherein at least two sections of the device are no longer coplanar (e.g., the first section of the device is positioned within a separate plane from the second section of the device).

The device 100 may be configured to move or bend about an axis near or adjacent to the transition section 108 of the device.

Figure 2:
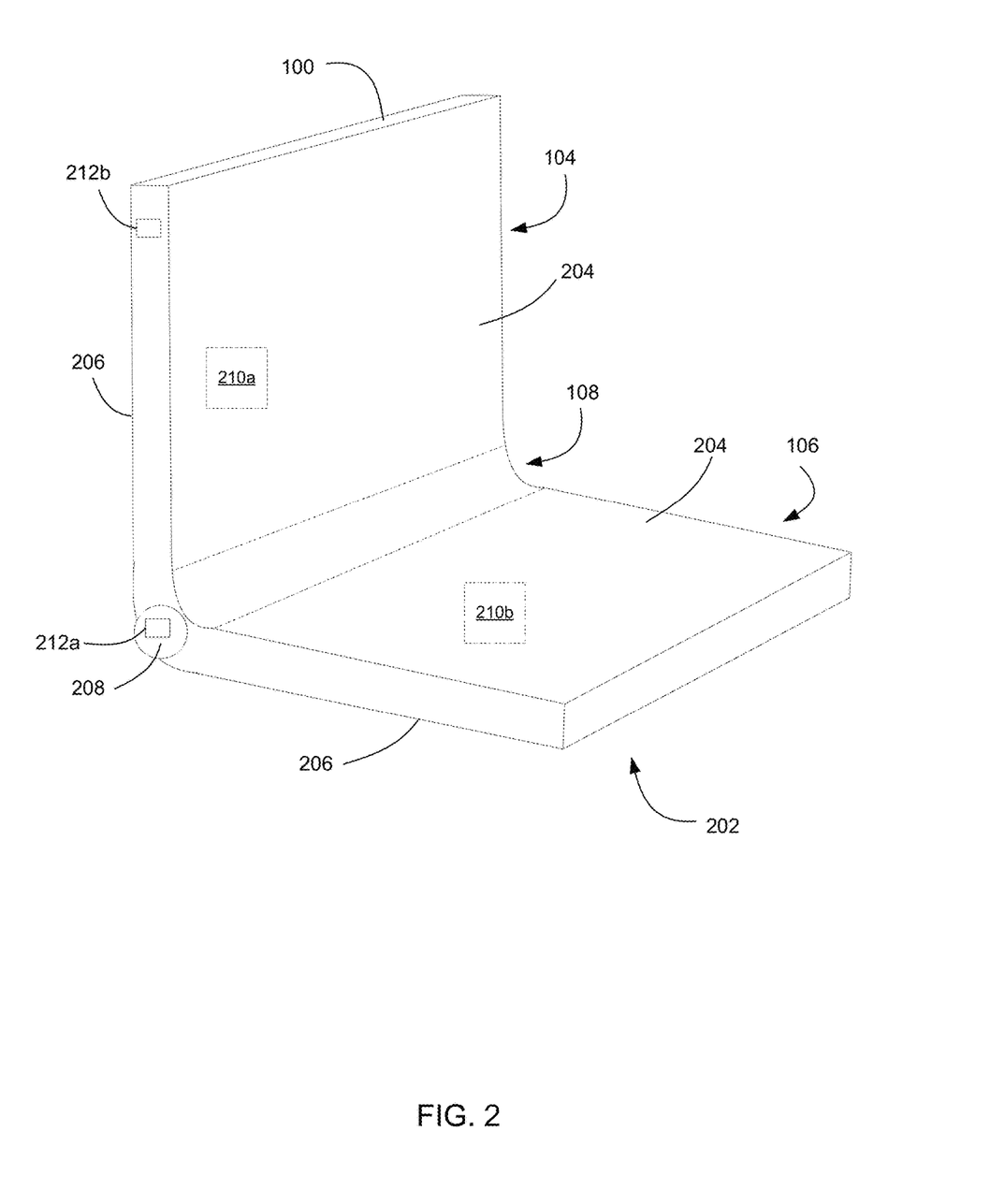
FIG. 2 depicts an example of the flexible electronic device of FIG. 1, wherein the device is bent about an axis near the transition section.

FIG. 2 depicts such an example of the flexible electronic device 100, wherein the device is bent about an axis near the transition section 108. In this bent configuration 202, the first section 104 of the device is positioned in a separate plane from the second section 106 of the device. A first surface 204 of the device 100 within the first section 104 of the device 100 is positioned at approximately a 90-degree angle from the first surface 204 within the second section 106 of the device. Additionally, a second, opposite surface 206 of the device 100 within the first section 104 is positioned at approximately a 270-degree angle from the second surface 206 of the device 100 within the second section 106.

As noted above, the flexibility of the electronic device 100 may be advantageous in providing a more compact, portable device. Additionally, the flexibility may allow for different operating capabilities in different configurations (e.g., a tablet computer or display monitor in a flat configuration, and a laptop computer in a bent configuration).

The device 100 may include a hinge 208, and the device may be configured to bend about the hinge 208. The hinge may include clamps or other connection elements configured to secure the first and second sections of the flexible electronic device. Any particular shape or design for the hinge is possible. In one particular example, the hinge 208 is a cylindrical hinge. In another example, the hinge is a multi-pivot hinge configured to bend the flexible electronic device in opposite directions (e.g., as described in FIGS. 4 and 5 below). In one example, the hinge is or is similar to an armadillo hinge assembly, as disclosed in U.S. Patent Publication No. 2016/0132075, herein incorporated by reference in its entirety. The hinge 208 may extend from one edge of the device to a second edge of the device. Alternatively, the hinge may extend less than the full length or width of the device. The hinge 208 may be fully or at least partially positioned within the transition section 108 of the device.

The flexible electronic device 100 may include one or more internal electronic components 210a, 210b within one or more of the sections of the device. The internal electronic component 210a, 210b may be a sensor, processor, integrated circuit, printed circuit board, battery, vapor chamber, heat pipe, heat sink, or heat fin. In certain examples, duplicative components may be positioned in both the first section 104 and the second section 106 of the device. For instance, the first section 104 and the second section 106 may each have their own processor, battery, and/or integrated circuit.

In certain examples, the internal electronic device 210a, 210b is a sensor configured to identify the position of the first section 104 relative to the second section 106 of the device. In certain examples, a sensor or a plurality of sensors may be positioned adjacent to, on, or within the hinge of the device. In other examples, a sensor may be positioned within one or more of the sections of the device. For example, at least one sensor may be positioned in the first section 104 and at least one additional sensor may be positioned within the second section 106. The sensor may be an accelerometer, gyroscope, inclinometer, or any similar type of sensor now known or later developed for identifying the positioning or orientation of an object.

In some examples, the sensor may be in communication (wired or wirelessly) with a processor configured to analyze the sensor's data and determine the orientation of the first section of the device relative to the second section of the device.

The processor may be positioned within the same section as the sensor, or in a different section from the sensor. In some examples, the flexible electronic device 100 includes a single processor positioned in one of the first section 104 or second section 106. In another example, the device includes a processor positioned in the first section 104 and the second section 106. For instance, a sensor and a processor may be positioned in each of the first section 104 and second section 106. The processors may be in communication with each other to determine the relative positioning of the sections.

Determining the relative position of the first and second sections of the device may be advantageous in determining what is displayed within each section of the display unit. For example, if the one or more sensors and processors determine that the first and second sections of the device are coplanar, then the processor(s) may be configured to display a single, continuous image extending across the first and second sections. Alternatively, if the one or more sensors and processors determine that the first and second sections of the device are not coplanar (i.e., the first section is positioned in a separate plane from the second section), then the processor(s) may be configured to display a first image in the first section and a second, independent image (separate and distinct from the first image) in the second section. Furthermore, the processor(s) may be configured to display a third independent image in the transition section between the first and second sections when the first and second sections are not coplanar.

In some examples, different applications may be run or different images may be displayed within the different sections of the display unit based upon the determined position or angle of the first section relative to the second section (wherein the angle is defined with the vertex is at the transition section of the device and the rays extending in the directions of the far edges of the first and second sections, opposite from the transition section). For instance, one application may be run or one image may be displayed within the first section of the device when a first surface of the first section is at a 90-degree angle from the first surface of the second section. A different application may be run or a different image may be displayed within the first section of the device when a first surface of the first section is at a 45-degree angle or a 135-degree angle, for example, from the first surface of the second section. This may be advantageous in providing a plurality of different configurable display options that are adjusted by the processor(s) based on the determined configuration of the flexible display device.

In some examples, the different applications or image displays may be programmable or configurable by an end user. For instance, a user may program the display unit to run a keyboard application and display a keyboard image within the first or second section when the flexible device has a determined angle between the first surface of the first section and the first surface of the second section of 45-135 degrees. The user may also program the same section to display a different image when the determined angle is less than 45 degrees. Different images may also be programmed when the determined angle is greater than 180 degrees, and any other determined angles.

The flexible electronic device 100 may include one or more external electronic components 212a, 212b positioned on a surface of one or more of the sections of the device. The external electronic component 212a, 212b may be a power button, volume toggle, docking port, headphone jack, universal serial bus (USB) port, high-definition multimedia interface (HDMI) connection, or any other audio/video interface for transmitting compressed audio or video data to an external device. The external components may be positioned at any particular location along the outer surface of the flexible electronic device.

In one example, the external component 212a is a docking port. This is advantageous as the docking port allows the flexible electronic device to physically dock with a separate electronic device (e.g., a mouse, keyboard or other peripheral device) or docking station, which itself may be in communication with a peripheral device such as the keyboard or mouse. In some examples, the docking port 212a is centrally located along one edge of the device. The docking port 212a may be positioned within the transition section 108 of the flexible electronic device 100. In some examples, the docking port 212a is positioned on or within the hinge 208 of the device.

Figure 3:
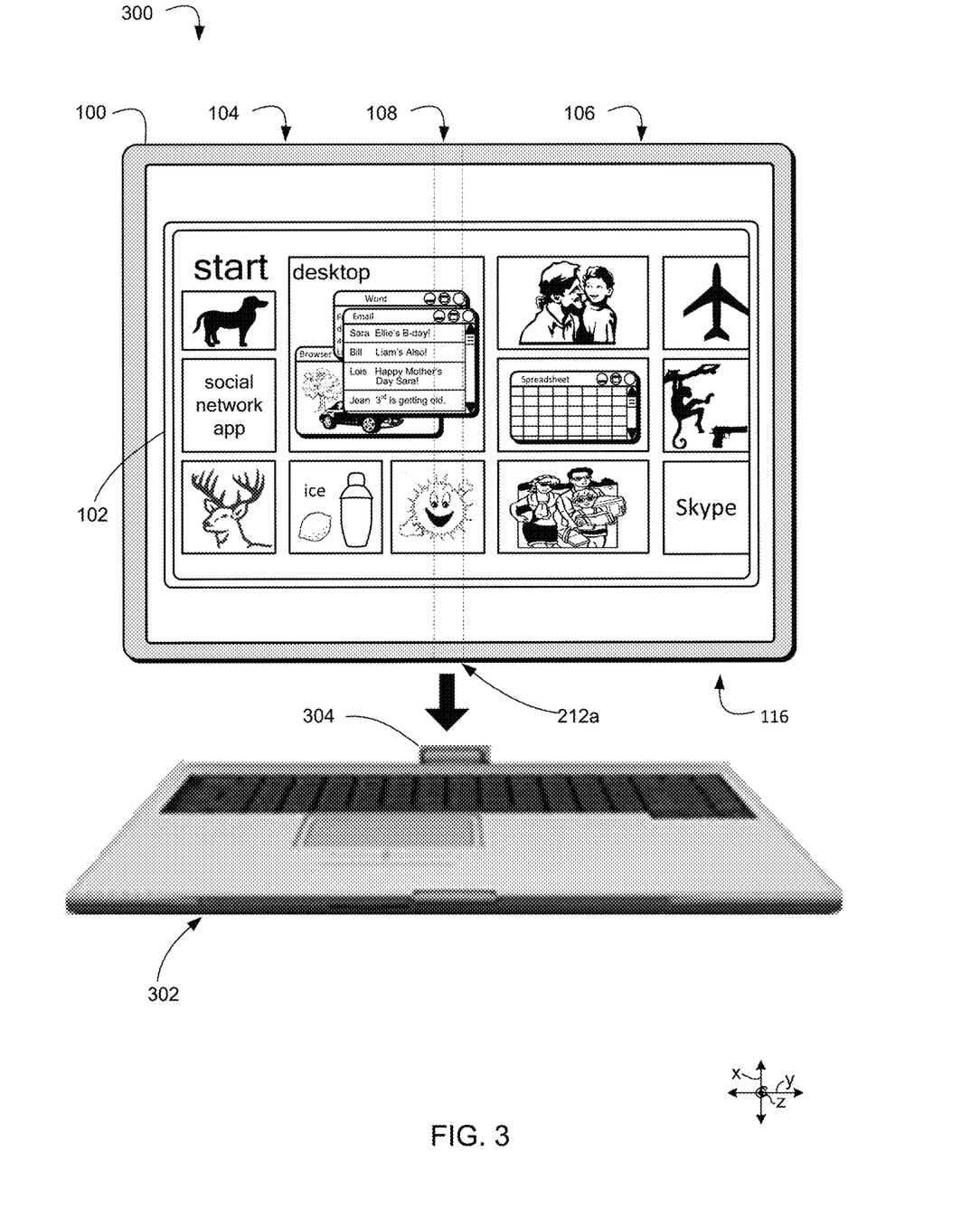
FIG. 3 depicts an example of the flexible electronic device of FIG. 1 and a docking station.

FIG. 3 depicts an example of a system 300 including a flexible electronic device 100 and an external electronic device 302 (e.g., a docking station). In this example, the docking port 212a is centrally positioned along an edge of the flexible display device 100, within the transition section 108 of the device. Moving the device 100 into a dock 304 of the external electronic device 302 may provide a number of advantages. For one, the flexible electronic device 100 may be used solely as a display monitor, while the external device 302 (e.g., a keyboard and mouse) may be used for input functions in conjunction with the display monitor. Additionally, the flexible electronic device 100 may be powered and/or controlled by the external electronic device 302 upon docking.

In certain examples, such as depicted in FIG. 3, the flexible electronic device 100 may be docked when the device is positioned in an open, flat configuration 116 such that the first section 104 and the second section 106 are coplanar. In other examples, the device may be docked when the device is in a bent configuration such that the first and second sections are not coplanar.

Regarding the flexibility of the device itself, the device may be moved or bent between a plurality of positions or configurations. In one configuration, the device is a flat, planar configuration 116 as depicted in FIG. 1. In another configuration, one surface of the first section may be moved to abut or be adjacent to a surface of the second section.

Figure 4:
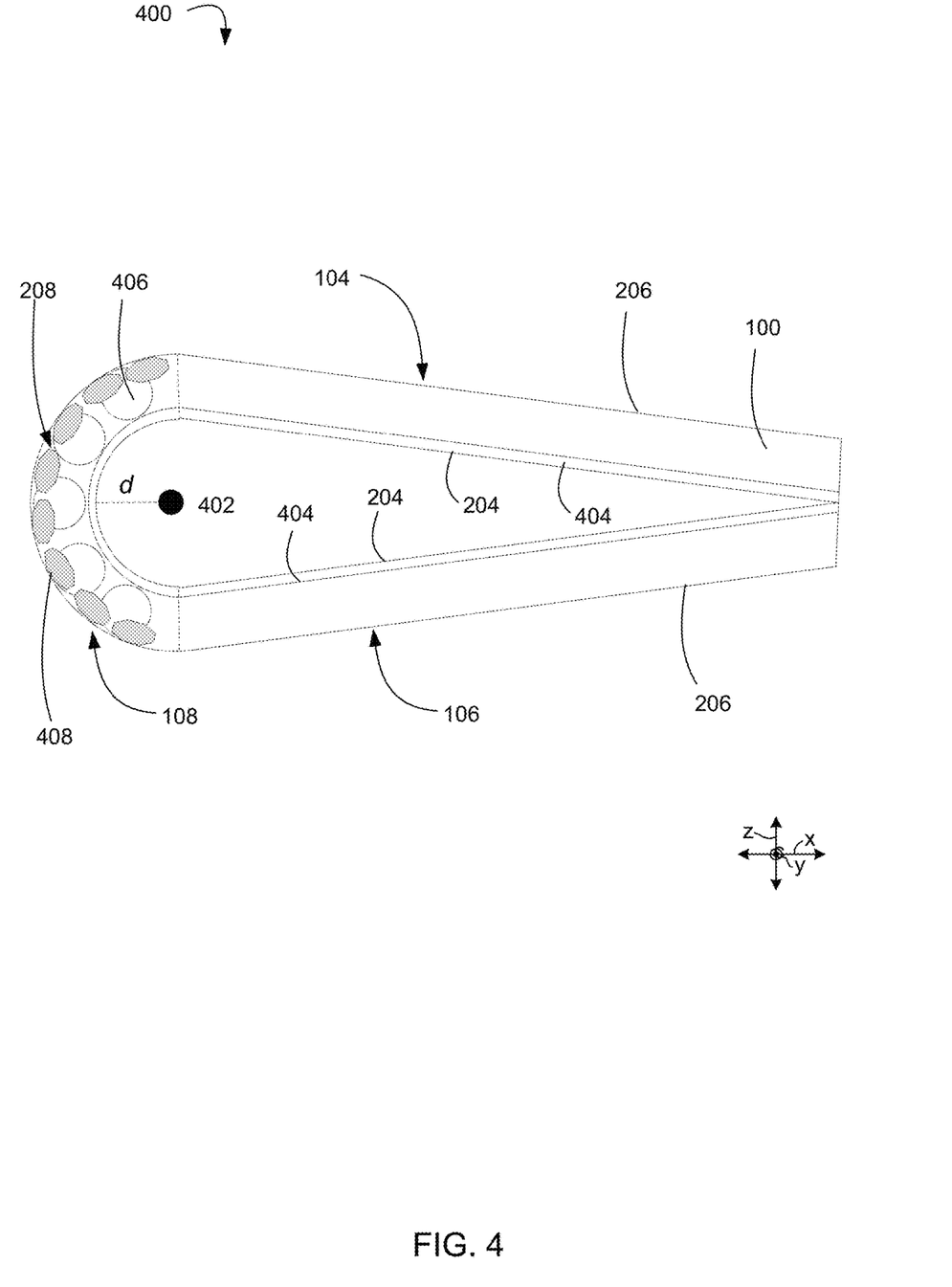
FIG. 4 depicts an example of the flexible electronic device of FIG. 1, wherein the device is in a first closed position such that a first surface of the first section abuts or is adjacent to a first surface of the second section of the device.

FIG. 4 depicts an example of a bent, closed configuration 400 for the flexible electronic device 100, wherein the display area 404 is enclosed within an internal area, extending across the first section 104, transition section 108, and second section 106. As depicted in FIG. 4, a first surface 204 of the device within the first section 104 abuts the same first surface 204 of the device within the second section 206. In alternative examples, the first surface of the device within the first section may be configured to be moved into a position adjacent to but not touching the first surface of the device within the second section. As noted above, these configurations are advantageous in providing a more compact, transportable mobile device when compared with the fully open device depicted in FIG. 1. Additionally, because the display area 404 is enclosed within an internal area in the closed configuration 404, the display area 404 of the device may be protected or covered from external components directly contacting the display area 404.

To move from the open configuration 116 depicted in FIG. 1 to the closed configuration 400 depicted in FIG. 4, the device bends or moves about an axis 402 positioned in a same plane as a center of the transition section (e.g., x-y plane of FIG. 4), at a distance d greater than zero from the first surface 204 of the flexible electronic device 100 positioned in the plane. The distance d may be 0.1 mm, 0.5 mm, 1 mm, 2 mm, 3 mm, 4 mm, 5 mm, 6 mm, 7 mm, 8 mm, 9 mm, 10 mm, or greater from the surface 204 of the device.

In other examples, in the open and closed configurations (as well as any intermediate configuration in between), no portion on the surface 204 of the device within the transition section 108 contacts another portion of the surface 204 of the device within the transition section 108. In other words, a portion of the surface 204 in the transition section 108 does not contact any another portion of the surface 204 in the transition section 108 in any configuration.

As depicted in FIG. 4, the device includes a multi-pivot hinge 208 within the transition area 108. The hinge 208 includes wheel elements 406 and octagonal rods 408 extending along the y-axis. The wheel elements 406 and/or octagonal rods 408 may be positioned near the surface 206 or form a portion of the surface 206 of the device. The wheel elements 406 and octagonal rods 408 are advantageous in allowing the device to bend or move about axis 402 in FIG. 4, as well as axis 502 depicted in FIG. 5 below. In other words, the wheel elements 406 and octagonal rods 408 allow for two separate directions of bending from the open, flat configuration 116 of FIG. 1. Other shaped rods or elements may be provided within the hinge 208 to achieve a similar result. For example, a hexagonal or cylindrical rod may allow for a similar multi-pivot configuration.

These configurations are advantageous in protecting the internal components of the flexible display device. In particular, this is advantageous in protecting the various components of a display unit in the device from being damaged. For example, an array of pixels within a light emitting diode unit are not folded on top of each other in the closed configuration 400 depicted in FIG. 4. Instead, each pixel or array of pixels maintains a distance greater than zero from its neighboring pixel or array of pixels. As such, the flexible electronic display device 100 may undergo a plurality of openings and closings about the axis 402 without damage to its internal components (e.g., display unit having an array of pixels).

In some examples, the flexible electronic device may be configured to move between the open configuration 116 depicted in FIG. 1 to a separate closed configuration, opposite the configuration depicted in FIG. 4.

Figure 5:
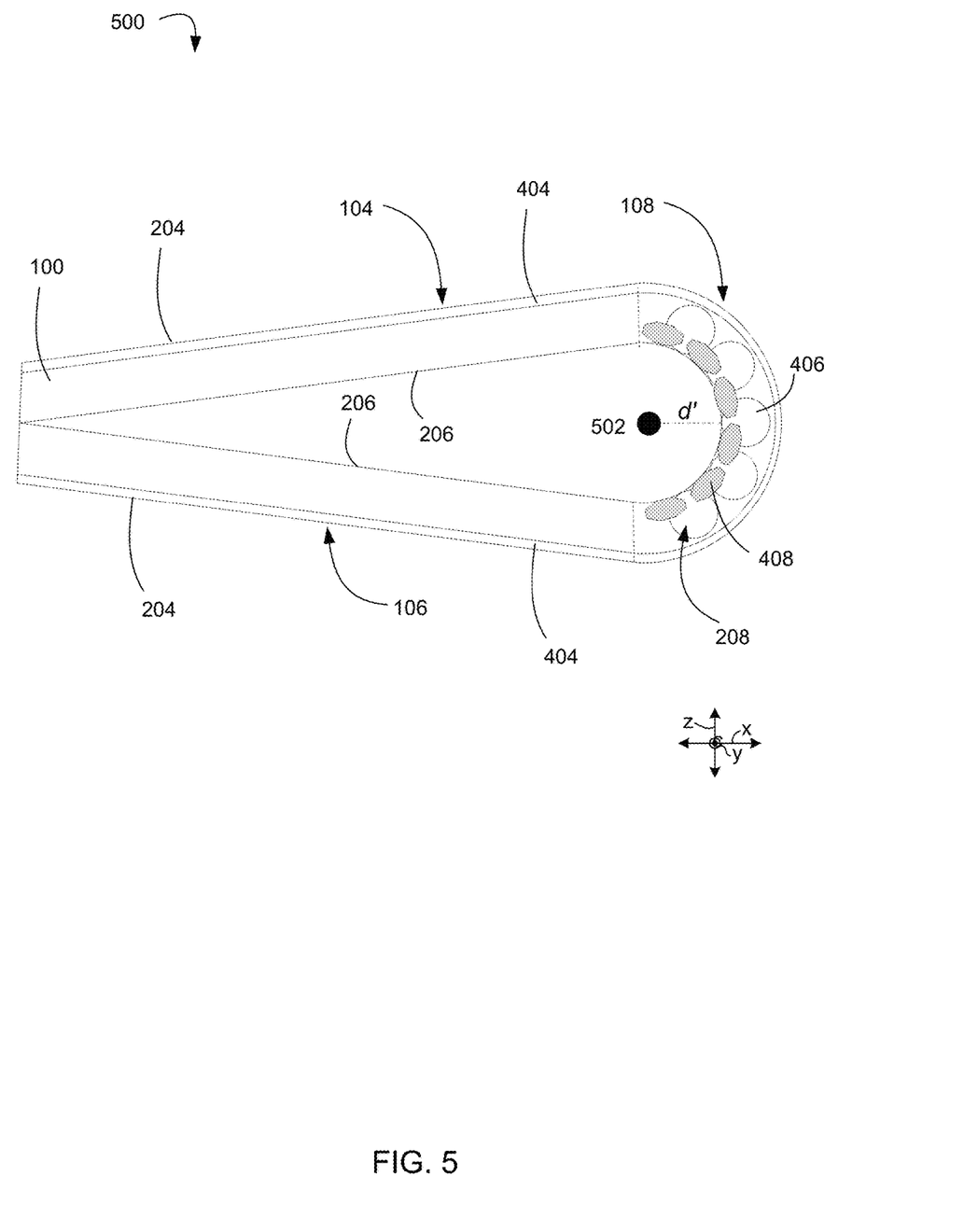
FIG. 5 depicts an example of the flexible electronic device of FIG. 1, wherein the device is in a second closed position such that a second surface of the first section abuts or is adjacent to a second surface of the second section of the device.

FIG. 5 depicts this additional example of a bent, closed configuration 500 for the flexible electronic device, wherein the display area 404 is positioned on the outside of the configuration 500, extending across the first section 104, transition section 108, and second section 106. As depicted in FIG. 5, the second surface 206 of the device 100 within the first section 104 abuts the same, second surface 206 of the device within the second section 106 (wherein the second surface 206 represents the opposite outer surface of the device from the first surface 204). In some alternative examples, the second surface 206 within the first section 104 may be configured to be moved into a position adjacent to but not touching the second surface 206 of the device within the second section 106. As noted above, these configurations are advantageous in providing a more compact, transportable mobile device when compared with the fully open device depicted in FIG. 1. Additionally, this configuration 500 may also be advantageous in displaying separate sections of the display area 404 in opposite directions, such as for two users positioned on opposite sides of the device, facing each other.

To move from the open configuration 116 depicted in FIG. 1 to the closed configuration 500 depicted in FIG. 5, the device bends or moves about a second axis 502 (separate from the axis 402 described in FIG. 4), wherein the second axis 502 is also positioned in a same plane (e.g., the x-y plane) as a center of the transition section 108, at a distance d' greater than zero from the second surface 206 of the flexible electronic device 100 positioned in the plane. The distance d' may be 0.1 mm, 0.5 mm, 1 mm, 2 mm, 3 mm, 4 mm, 5 mm, 6 mm, 7 mm, 8 mm, 9 mm, 10 mm, or greater from the surface 206 of the device. In some examples, the distance d' is the same as the distance d described in FIG. 4. In other examples, the distances d and d' are different lengths.

In other examples, in the open and closed configurations (as well as any intermediate configuration in between), no portion on the surface 206 of the device within the transition section 108 contacts another portion of the surface 206 of the device within the transition section 108. In other words, a portion of the surface 206 in the transition section 108 does not contact any another portion of the surface 206 in the transition section 108 in any configuration.

As discussed above with FIG. 4, this is advantageous in protecting the internal components of the flexible display device (e.g., the display unit) from being damaged. Like the arrangement in FIG. 4, the array of pixels within the display unit of FIG. 5 are not folded on top of each other in this second, closed configuration 500. Instead, each pixel or array of pixels maintains a distance greater than zero from its neighboring pixel or array of pixels. As such, the flexible electronic display device 100 may undergo a plurality of openings and closings about the axis 502 without damage to its internal components (e.g., display unit having an array of pixels).

Figure 6:
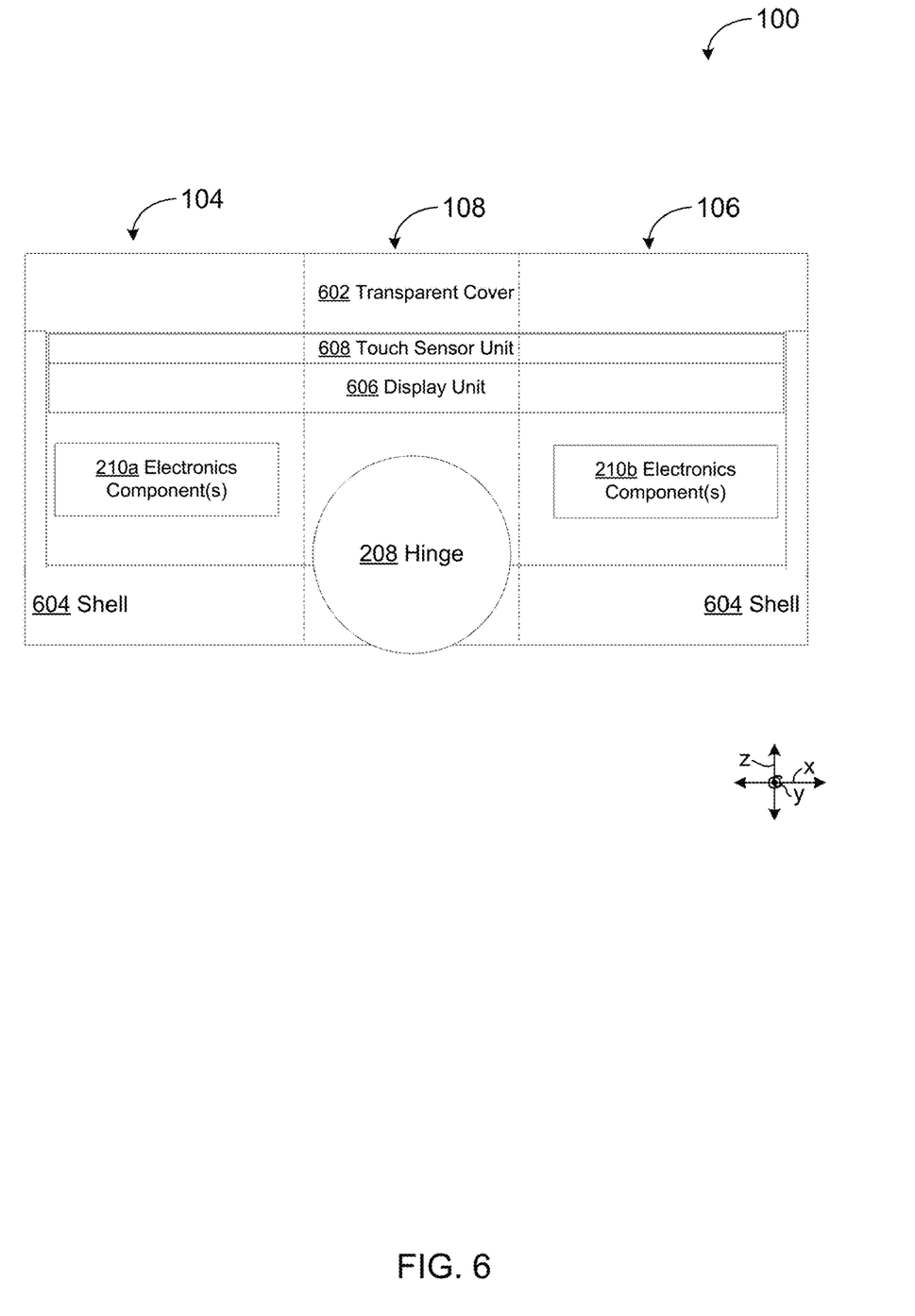
FIG. 6 depicts an example of various components of the flexible electronic device of FIG. 1.

FIG. 6 depicts a cross-sectional view of a portion of a flexible electronic device 100 having a first section 104, a second section 106, and a transition section 108 positioned between the first section 104 and the second section 106. As depicted, the electronic device 100 includes a transparent cover 602, a shell 604, and a display unit 606 disposed between the transparent cover 602 and the shell 604. A hinge 208, positioned at least partially within the transition section 108 of the device, is also provided. The hinge 208 may be positioned between the display unit 606 and the shell 604. Alternatively, at least a portion of the hinge 208 may extend outside of the shell 604. As noted above, the device 100 may be configured to bend about the hinge 208.

The transparent cover 602 may be a flexible material composed of glass, plastic, and/or other transparent materials that permit a user of the electronic device 100 to view images created by the display unit 106.

The shell 604 may be composed of plastic, glass, ceramics, fiber composites, metals, or any combination thereof. The shell 604 may be composed of a similar or different material as the transparent cover 602. In some examples, the shell is composed of a flexible material. In certain examples, at least a portion of the shell 604 is transparent, such that images generated by the display unit may be displayed in either direction (i.e., in a direction of the transparent cover 602 or the opposite direction of the shell 604). This may be advantageous in displaying certain images or notifications on the shell of the device 100, particularly when the device is in a closed configuration (e.g., the configuration 400 depicted in FIG. 4).

The electronic device 100 may include at least one internal electronics component 210a, 210b disposed between the display unit 606 and the shell 604. In some examples, the internal electronics component 210a, 210b is a sensor (e.g., an accelerometer, gyroscope, or inclinometer). In other examples, the internal electronics component 210a, 210b is a battery. In another example, the internal electronics component 210a, 210b is a heat dissipation component such as a vapor chamber, heat pipe, heat sink, or heat fin. Alternatively, the internal electronics component 210a, 210b is a processor, integrated circuit, or printed circuit board. As depicted in FIG. 6, the first section 104 and the second section 106 include at least one internal electronic component 210a, 210b each (e.g., a sensor and/or processor). In certain examples, the at least one internal electronics component 210a, 210b is supported within the electronic device 100 by an internal support. The at least one internal electronics component 210a, 210b may be adhesively or otherwise secured or mounted to the internal support. In other cases, the device 100 does not include an internal support.

The display unit 606 may include a liquid crystal display (LCD), a light emitting diode (LED) unit, or an organic light emitting diode (OLED) unit. The display unit 606 may be configured as a display module stack. The display module stack may include any number of optical layers or films. Each layer of the display unit 606 may be structurally supported by the internal support. In some examples, the display unit 606 includes a LED unit or an OLED unit. In other examples, the display unit 606 includes a LCD unit and backlight unit. The backlight unit may be a laminated backlight unit, wherein the various layers of the backlight unit are adhered to each other via adhesion layers.

In this example, the electronic device 100 includes a touch sensor unit 608 configured to detect a user's touch or proximity to a surface of the electronic device and generate a signal representing the location of contact on the sensor or proximity to the surface of the device and the respective sensor. For example, the touch sensor unit may be configured to detect a user hovering near or touching the surface of the transparent cover with their finger, hand, or an object held within their hand such as a stylus. The touch sensor unit 608 may be disposed between the transparent cover 602 and the display unit 606. The touch sensor unit 608 may include one or more layers formed on, applied to, or otherwise secured to the transparent cover 602 and/or the display unit 606. The touch sensor unit 608 may be coupled to a controller or processor within the device 100 via capacitance detection circuitry and an interface. The interface may be implemented as software running on the processor or as a hardware interface. When a user or other object (e.g., stylus) contacts or comes within a certain proximity of a sensor of the touch sensor unit 608, the capacitance detection circuitry detects changes in capacitance as an indication of contact. The circuitry generates signals that are passed to the processor for determination of a location of the touch on the sensor.

The electronic device 100 may include fewer, additional, or alternative display-related components. For example, in some cases, one or more components of the display unit 606 may also serve as the transparent cover 602. For instance, rather than having a separate, additional cover, one of the layers or components of the display unit may be used as an external display layer. For example, the external display layer may be or include an external polarizer of an LCD panel. The external polarizer may include a hard coating (e.g., powdered or nano-scale glass in a polymer binder) for protection during use. Alternatively, or additionally, a color filter glass layer of the LCD panel may be configured and disposed to act as a glass substrate for the external display layer. In such cases, a touch sensor unit 608 may be formed upon or added to the color filter glass layer in an in-cell touch sensor arrangement. Other touch display arrangements may be used.

Adjacent units, layers, or other elements or components of the display unit 606 may be bonded together or otherwise secured to one another, e.g., via an adhesive layer. For example, the transparent cover 602 or touch sensor unit 608 may be bonded to the front or upper surface of the display unit via an adhesive layer. Each layer or subunit of the display unit 606 may also be configured as a solid or laminated stack of layers or films.

In certain examples, the adhesive layers may include one or more pressure-sensitive adhesive materials. Additional or alternative types of adhesive materials and films may be used, including, for instance, moisture or thermally cured adhesive materials. The adhesive materials of the adhesive layers may be silicone-based, epoxy-based and/or acrylic-based materials.

Figure 7:
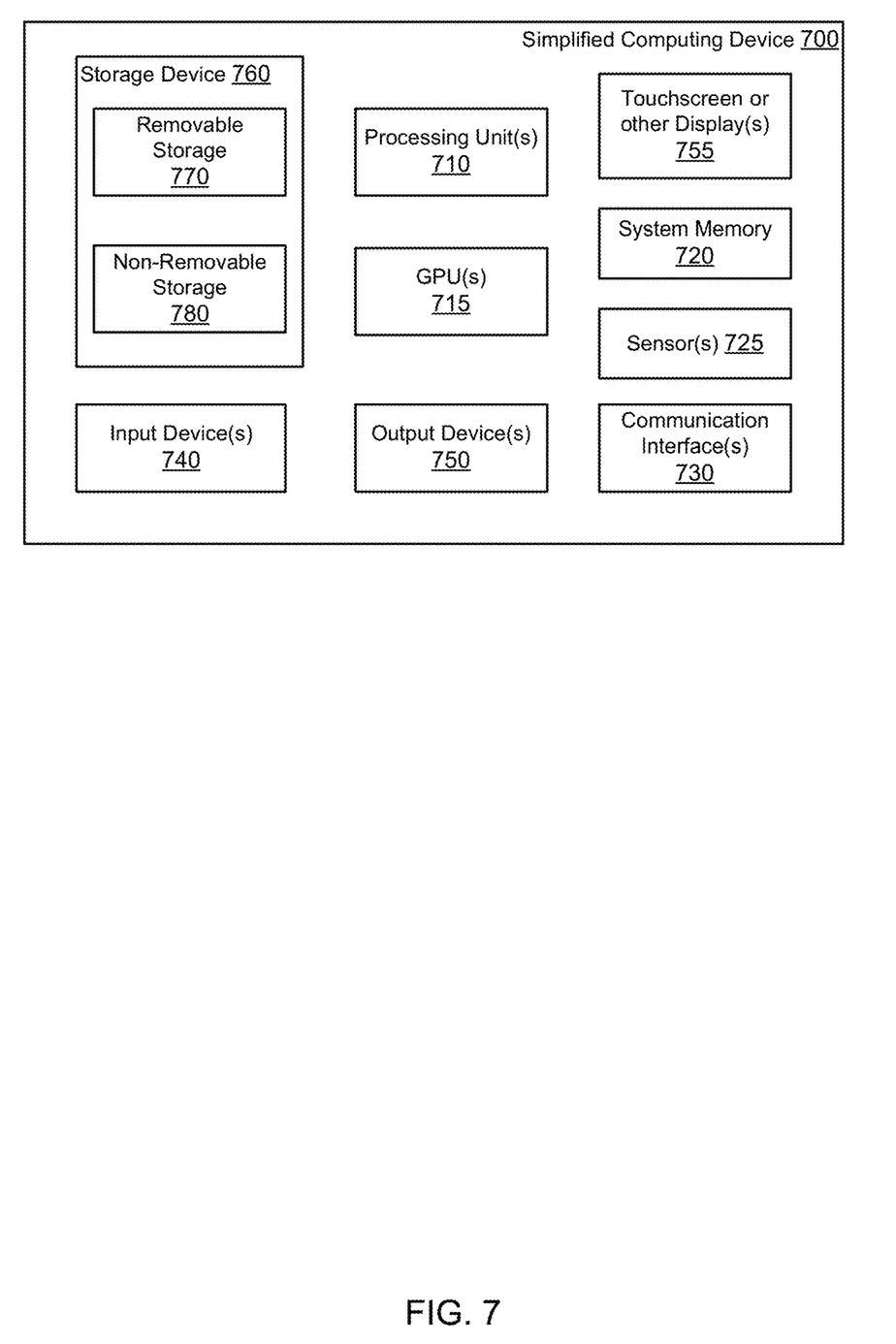
FIG. 7 is a block diagram of a computing environment in accordance with one example of a flexible electronic device disclosed herein.

With reference to FIG. 7, the flexible electronic devices described above may be incorporated within a computing environment 700. The computing environment 700 may correspond with one of a wide variety of flexible electronic computing devices, including, but not limited to, personal computers (PCs), tablet and other handheld computing devices, laptop or mobile computers, communications devices such as mobile phones, multiprocessor systems, microprocessor-based systems, programmable consumer electronics, minicomputers, or audio or video media players. In certain examples, the computing environment 700 is a flexible wearable electronic device, wherein the device may be worn on or attached to a person's body or clothing. The flexible wearable electronic device may be attached to a person's shirt or jacket; worn on a person's wrist, ankle, waist, or head; or worn over their eyes or ears. Such wearable devices may include a watch, heart-rate monitor, activity tracker, or head-mounted display.

The computing environment 700 has sufficient computational capability and system memory to enable basic computational operations. In this example, the computing environment 700 includes one or more processing unit(s) 710, which may be individually or collectively referred to herein as a processor. The computing environment 700 may also include one or more graphics processing units (GPUs) 715. The processor 710 and/or the GPU 715 may include integrated memory and/or be in communication with system memory 720. The processor 710 and/or the GPU 715 may be a specialized microprocessor, such as a digital signal processor (DSP), a very long instruction word (VLIW) processor, or other microcontroller, or may be a general purpose central processing unit (CPU) having one or more processing cores. The processor 710, the GPU 715, the system memory 720, and/or any other components of the computing environment 700 may be packaged or otherwise integrated as a system on a chip (SoC), application-specific integrated circuit (ASIC), or other integrated circuit or system.

The computing environment 700 may also include one or more sensors 725 (e.g., an accelerometer, gyroscope, or inclinometer) configured to determine the orientation of various sections of the flexible electronic device. As noted above, the sensors may be configured to identify an orientation or position of a first section of the flexible electronic device relative to the orientation of a second section of the device.

The computing environment 700 may also include other components, such as, for example, a communications interface 730. One or more computer input devices 740 (e.g., pointing devices, keyboards, audio input devices, video input devices, haptic input devices, or devices for receiving wired or wireless data transmissions) may be provided. The input devices 740 may include one or more touch-sensitive surfaces, e.g., track pads. Various output devices 750, including touchscreen or touch-sensitive display(s) 755, may also be provided. The output devices 750 may include a variety of different audio output devices, video output devices, and/or devices for transmitting wired or wireless data transmissions.

The computing environment 700 may also include a variety of computer readable media for storage of information such as computer-readable or computer-executable instructions, data structures, program modules, or other data. Computer readable media may be any available media accessible via storage devices 760 and includes both volatile and nonvolatile media, whether in removable storage 770 and/or non-removable storage 780. Computer readable media may include computer storage media and communication media. Computer storage media may include both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the processing units of the computing environment 700.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

Claim Support Section

In a first embodiment, a flexible electronic device comprises a display unit having a continuous display area extending across a first section, a second section, and a transition section of the flexible electronic device, wherein the transition section is positioned between the first section and the second section, and wherein the flexible electronic device is configured to bend about a first axis positioned in a same plane as a center of the transition section, at a distance greater than zero from a first surface of the flexible electronic device positioned in the plane.

In a second embodiment, a flexible electronic device comprises: a transparent cover; a hinge; and a display unit disposed between the transparent cover and the hinge, wherein the display unit comprises a continuous display area extending across a first section, a second section, and a transition section of the flexible electronic device, wherein the transition section is positioned between the first section and the second section, wherein the hinge is positioned at least partially within the transition section, wherein the flexible electronic device is configured to bend about the hinge and move between a plurality of positions, and wherein a portion of the transparent cover in the transition section does not contact any another portion of the transparent cover in the transition section in any position of the plurality of positions.

In a third embodiment, a flexible electronic device comprises a display unit having a continuous display area extending across a first section, a second section, and a transition section of the flexible electronic device, wherein the transition section is positioned between the first section and the second section; a sensor configured to identify a position of the first section of the flexible electronic device relative to the second section of the flexible electronic device; and a processor configured to determine which image or images to display on the display unit based on the identified position.

In a fourth embodiment, with reference to any of embodiments 1-3, the flexible electronic device is configured to move from an open position to a closed position, wherein, in the open position, the first section and the second section of the flexible electronic device are coplanar, and wherein, in the closed position, a portion of the first surface of the flexible electronic device within the first section abuts or is adjacent to a portion of the first surface of the flexible electronic device within the second section.

In a fifth embodiment, with reference to any of embodiments 1-4, the flexible electronic device is configured to bend about a second axis positioned in the plane, at a distance greater than zero from a second surface of the flexible electronic device positioned in the plane, wherein the second surface is an opposite external surface from the first surface.

In a sixth embodiment, with reference to the fifth embodiment, the flexible electronic device is configured to move from an open position to a closed position, wherein, in the open position, the first section and the second section of the flexible electronic device are coplanar, and wherein, in the closed position, a portion of the second surface of the flexible electronic device within the first section abuts or is adjacent to a portion of the second surface of the flexible electronic device within the second section.

In a seventh embodiment, with reference to the fifth or sixth embodiment, the flexible electronic device is configured to move from a first closed position to a second closed position, wherein, in the first closed position, a portion of the first surface of the flexible electronic device within the first section abuts or is adjacent to a portion of the first surface of the flexible electronic device within the second section, and wherein, in the second closed position, a portion of the second surface of the flexible electronic device within the first section abuts or is adjacent to a portion of the second surface of the flexible electronic device within the second section.

In an eighth embodiment, with reference to any of embodiments 1-7, the display unit comprises a liquid crystal display (LCD), a light emitting diode (LED) unit, or an organic light emitting diode (OLED) unit.

In a ninth embodiment, with reference to any of embodiments 1-8, the device further comprises: a first internal electronics component positioned within the first section of the flexible electronic device; and a second internal electronics component positioned within the second section of the flexible electronic device.

In a tenth embodiment, with reference to the ninth embodiment, the first internal electronics component is a first sensor, first battery, first processor, first integrated circuit, or first printed circuit board, and wherein the second internal electronics component is a second sensor, second battery, second processor, second integrated circuit, or second printed circuit board.

In an eleventh embodiment, with reference to any of embodiments 1-10, the device further comprises a sensor configured to identify a position of the first section of the flexible electronic device relative to the second section of the flexible electronic device, wherein the display unit is configured to display a first image within the first section and a second, independent image within the second section based on the identified position.

In a twelfth embodiment, with reference to the eleventh embodiment, the sensor is an accelerometer, gyroscope, or inclinometer.

In a thirteenth embodiment, with reference to the eleventh or twelfth embodiment, the display unit is configured to display a third, independent image within the transition section based on the identified position.

In a fourteenth embodiment, with reference to any of embodiments 1-13, the device further comprises a docking port such that the flexible electronic device is configured to physically dock with an external docking station.

In a fifteenth embodiment, with reference to any of embodiments 2 and 4-14, the hinge is a cylindrical hinge.

In a sixteenth embodiment, with reference to any of embodiments 1-15, the device further comprises a touch sensor unit disposed between the transparent cover and the display unit.

In a seventeenth embodiment, with reference to any of embodiments 1-16, the display unit is configured to display a uniform image extending across the first section, the second section, and the transition section when the sensor identifies that the first section and second section are coplanar.

In an eighteenth embodiment, with reference to any of embodiments 1-17, the display unit is configured to display a first image within the first section and a second, independent image within the second section when the sensor identifies that the first section and second section are not coplanar.

In a nineteenth embodiment, with reference to the eighteenth embodiment, the display unit is further configured to display a third, independent image within the transition section when the sensor identifies that the first section and second section are not coplanar.

What is claimed is:

1. A flexible electronic device comprising:
a display unit having a continuous display area extending across a first section, a second section, and a transition section of the flexible electronic device; and
a sensor configured to identify a position of the first section of the flexible electronic device relative to the second section of the flexible electronic device,
a docking port positioned in the transition section such that the flexible electronic device is configured to physically dock with an external docking station,
wherein the transition section is positioned between the first section and the second section, and
wherein the flexible electronic device is configured to bend about a first axis positioned in a same plane as a center of the transition section, at a distance greater than zero from a first surface of the flexible electronic device positioned in the plane,
wherein the flexible electronic device is configured to bend about a second axis positioned in the plane at a distance greater than zero from a second surface of the flexible electronic device positioned in the plane,
wherein the second surface is an opposite external surface from the first surface, and
wherein the display unit is configured to display a touch-screen keyboard within the first section and a task bar or plurality of shortcut keys within the transition section when the sensor identifies that the first section and the second section are not coplanar.

2. The flexible electronic device of claim 1, wherein the flexible electronic device is configured to move from an open position to a closed position,
wherein, in the open position, the first section and the second section of the flexible electronic device are coplanar, and
wherein, in the closed position, a portion of the first surface of the flexible electronic device within the first section abuts or is adjacent to a portion of the first surface of the flexible electronic device within the second section.

3. The flexible electronic device of claim 1, wherein the flexible electronic device is configured to move from an open position to a closed position,
wherein, in the open position, the first section and the second section of the flexible electronic device are coplanar, and
wherein, in the closed position, a portion of the second surface of the flexible electronic device within the first section abuts or is adjacent to a portion of the second surface of the flexible electronic device within the second section.

4. The flexible electronic device of claim 1, wherein the flexible electronic device is configured to move from a first closed position to a second closed position,
wherein, in the first closed position, a portion of the first surface of the flexible electronic device within the first section abuts or is adjacent to a portion of the first surface of the flexible electronic device within the second section, and
wherein, in the second closed position, a portion of the second surface of the flexible electronic device within the first section abuts or is adjacent to a portion of the second surface of the flexible electronic device within the second section.

5. The flexible electronic device of claim 1, wherein the display unit comprises a liquid crystal display (LCD), a light emitting diode (LED) unit, or an organic light emitting diode (OLED) unit.

6. The flexible electronic device of claim 1, further comprising:
   a first internal electronics component positioned within the first section of the flexible electronic device; and
   a second internal electronics component positioned within the second section of the flexible electronic device.

7. The flexible electronic device of claim 6, wherein the first internal electronics component is a first sensor, first battery, first processor, first integrated circuit, or first printed circuit board, and
   wherein the second internal electronics component is a second sensor, second battery, second processor, second integrated circuit, or second printed circuit board.

8. The flexible electronic device of claim 1,
   wherein the display unit is configured to display a different image in the second section when the sensor identifies that the first section and the second section are not coplanar.

9. The flexible electronic device of claim 1, wherein the sensor is an accelerometer, gyroscope, or inclinometer.

10. A flexible electronic device comprising:
    a transparent cover;
    a hinge;
    a sensor; and
    a display unit disposed between the transparent cover and the hinge,
    wherein the display unit comprises a continuous display area extending across a first section, a second section, and a transition section of the flexible electronic device,
    a docking port positioned in the transition section such that the flexible electronic device is configured to physically dock with an external docking station,
    wherein the transition section is positioned between the first section and the second section,
    wherein the display unit is configured to display a first image within the first section, a second image within the second section, and a third image within the transition section when the sensor identifies that the first section and the second section are not coplanar,
    wherein the first image is a touchscreen keyboard and the third image is a task bar or plurality of shortcut keys,
    wherein the hinge is positioned at least partially within the transition section,
    wherein the flexible electronic device is configured to bend about the hinge and move between a plurality of positions, and
    wherein a portion of the transparent cover in the transition section does not contact any another portion of the transparent cover in the transition section in any position of the plurality of positions.

11. The flexible electronic device of claim 10, wherein the hinge is a cylindrical hinge.

12. The flexible electronic device of claim 10, further comprising:
    a touch sensor unit disposed between the transparent cover and the display unit.

13. A flexible electronic device comprising:
    a display unit having a continuous display area extending across a first section, a second section, and a transition section of the flexible electronic device, wherein the transition section is positioned between the first section and the second section;
    a docking port positioned in the transition section such that the flexible electronic device is configured to physically dock with an external docking station,
    a sensor configured to identify a position of the first section of the flexible electronic device relative to the second section of the flexible electronic device; and
    a processor configured to determine which image or images to display on the display unit based on the identified position,
    wherein the display unit is configured to display a first image within the first section, a second image within the second section, and a third image within the transition section when the sensor identifies that the first section and the second section are not coplanar, and
    wherein the first image is a touchscreen keyboard and the third image is a task bar or plurality of shortcut keys.

14. The flexible electronic device of claim 13, wherein the sensor is an accelerometer, gyroscope, or inclinometer.

15. The flexible electronic device of claim 13, wherein the display unit is configured to display a uniform image extending across the first section, the second section, and the transition section when the sensor identifies that the first section and second section are coplanar.

* * * * *